United States Patent [19]

Hagqvist et al.

[11] Patent Number: 5,364,525
[45] Date of Patent: Nov. 15, 1994

[54] DEVICE FOR PURIFYING WATER

[75] Inventors: Peter Hagqvist, Älvsjö ; Per Fonser, Stockholm; Fredrik Dellby, Enskede, all of Sweden

[73] Assignee: Aktiebolaget Electrolux, Sweden

[21] Appl. No.: 953,549

[22] Filed: Oct. 29, 1992

[30] Foreign Application Priority Data

Oct. 31, 1991 [SE] Sweden .............................. 9103196-3

[51] Int. Cl.$^5$ .............................................. C02F 9/00
[52] U.S. Cl. .................... 210/190; 210/195.2; 210/266; 210/275; 210/284; 210/340
[58] Field of Search ............... 210/638, 663, 677, 678, 210/257.2, 259, 266, 275, 284, 340, 341, 190, 195.2

[56] References Cited

U.S. PATENT DOCUMENTS

| | | | |
|---|---|---|---|
| 2,774,732 | 12/1956 | Blight | 210/662 |
| 4,332,685 | 6/1982 | Nowlin et al. | 210/638 |
| 4,601,829 | 7/1986 | Kaneko et al. | 210/638 |
| 4,713,175 | 12/1987 | Bray | 210/266 |

FOREIGN PATENT DOCUMENTS 3543661 6/1987 Germany .
500913 2/1971 Switzerland .

Primary Examiner—Ivars Cintins
Attorney, Agent, or Firm—Pearne, Gordon, McCoy & Granger

[57] ABSTRACT

A device for purifying water comprises a filter unit (10) containing an osmotic membrane and provided with an inlet (11), a filtrate outlet (12), a return conduit (14) for a recirculating large flow of unfiltered water and having an outlet (22) for a small flow of reject water, According to the invention, two ion exchange units (17, 18) are arranged in parallel and connected to the filter unit (10) in such way that raw water entering the device is first passed through one of said ion exchange units to be softened, and that the reject water is passed in the opposite direction through the other ion exchange unit to regenerate the same. Valve means (19, 24) are provided for alternately shifting the ion exchange units between the functions of softening and regeneration.

4 Claims, 1 Drawing Sheet

DEVICE FOR PURIFYING WATER

BACKGROUND OF THE INVENTION

The present invention relates to a device for purifying water by means of reverse osmosis, and more specifically to such a device comprising a filter unit containing an osmotic membrane and having an inlet, a filtrate outlet, and a return conduit through which a relatively large flow of unfiltered water is returned to the inlet and a small flow of reject water is discharged from a reject outlet.

Reverse osmosis is an efficient method of purifying water. It is a problem in this connection, however, that the membrane surface is clogged by the separated substances, particularly when the content of calcium of the water is high, which reduces the result of the filtration. In order to avoid such clogging it is common to use a softening device which is provided upstream of the the membrane filter and is regenerated by some suitable salt.

The consumption of salt for regeneration of softeners increases with an increased use of softened water, for example in dishwashers and washing machines. In many places the percentage of salt of the waste water has increased beyond what would be preferable from an environmental point of view.

SUMMARY OF THE INVENTION

The object of the invention is to eliminate this problem and to provide a water purifying device in which the softener is regenerated without addition of salt. This has been achieved by means of a device of the type mentioned in the introduction which according to the invention is characterized by two ion exchange units arranged in parallel and connected to the filter unit in such way that raw water entering the device is first passed through one of said ion exchanger units to be softened and that reject water discharged via the the reject outlet is passed in the opposite direction through the other ion exchange unit to regenerate the same. Valve means are provided for alternately shifting the ion exchange units between the functions of softening and regeneration.

BRIEF DESCRIPTION OF THE DRAWINGS

The invention will be described in more detail in the following with reference to the accompanying drawing, in which.

DETAILED DESCRIPTION OF THE PREFERRED EMBODIMENT

Figure 1:
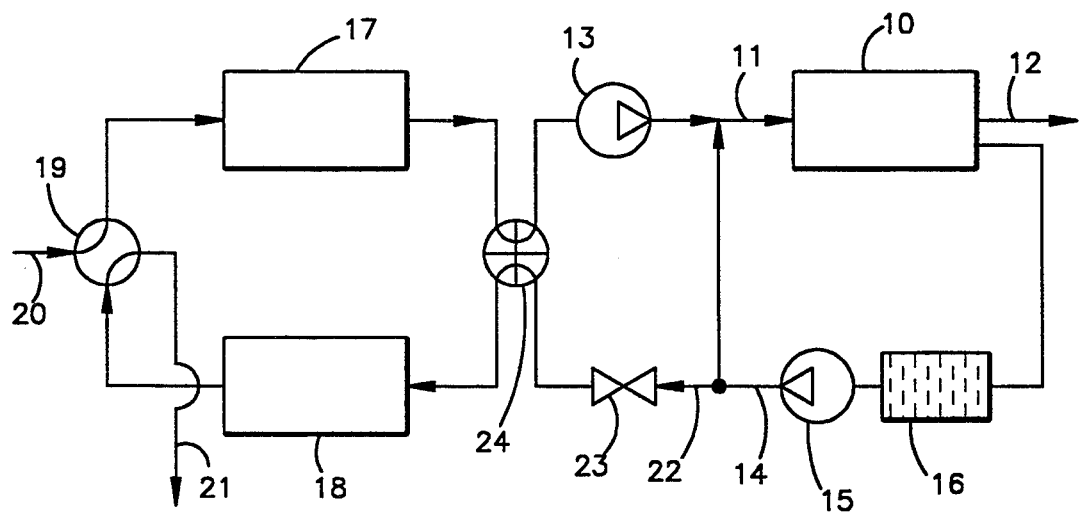
FIGS. 1 and 2 illustrate a preferred embodiment of the water purifier according to the invention in a diagrammatic form and the valve means in two different positions.

The device shown in the drawing comprises a filter unit 10 having a reverse osmosis membrane (not shown). The filter unit 10 is provided with an inlet 11, a filtrate outlet 12 for purified water, water passing through the membrane and a return conduit 14 through which a flow of unfiltered water, water unable to pass through the membrane is returned to the inlet 11, whereby a circulating flow system is formed. This system comprises a circulation pump 15, and a filter 16 which has a large filter area and is of such nature that chemical precipitations take place generally in this filter instead of on the membrane in the filter unit 10 which can thereby be kept in operation for a considerably longer time without being clogged. The filter 16 is a surface active filter comprising a suitable porous material such as active carbon or zeolite. When it has been clogged the filter is replaced which can be made at a resortable cost since such a filter is essentially less expensive than the osmotic membrane.

In order to provide the pressure required for the osmotic process the inlet conduit of the filter unit is provided with a pump 13 and the reject outlet 22 has a pressure release valve 23.

For softening the raw water entering the device two ion exchangers 17 and 18 are used which are arranged in parallel and which are regeneratable and connected to the system in such way that incoming raw water is softened in one of them while the other is being regenerated, and vice versa. To this end the ion exchangers are connected at one side to a raw water supply line 20 and to an outlet 21, respectively, by means of a first adjustable valve 19. At the other side thereof the ion exchangers 17, 18 are connected by means of a second adjustable valve 24 to the inlet 11 and the reject outlet 22, respectively, of the filter unit 10.

The ion exchangers contain a bed of preferably sulfonated polystyrene charged with natrium ions. Calcium ions entering with the raw water are absorbed while natrium is emitted. The released natrium ions and salts present in the raw water are unable to pass through the osmotic membrane. Thus, the water unable to pass through the membrane, or the recirculating liquid a natrium concentration which is 5 to 20 times as high as that of the raw water. This concentrate is conducted via the reject outlet 22 and the valve 24 to the other ion exchanger 18 (FIG. 1) which is regenerated while emitting calcium ions which are discharged with the reject flow via the outlet 21.

The major portion of the flow of water entering through the raw water inlet 20 leaves the device via the filtrate outlet 12, and the remaining portion, about 10 to 20%, is discharged via the reject outlet 22. As the reject flow is relatively small, the time spent by the liquid in the ion exchanger being regenerated is correspondingly prolonged which is advantageous for the regeneration process.

Figure 2:
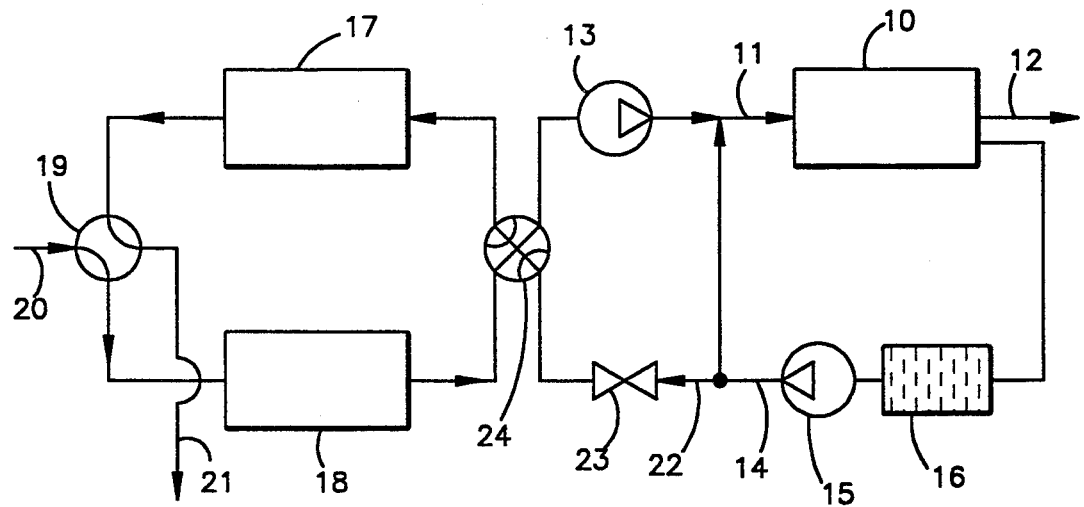

After a preferred predetermined time of operation, which is selected with regard to the capacity of the ion exchangers, water quality, etc., the valves 19 and 24 are adjusted to the position in FIG. 2. In this position, the entering flow passes through and is softened in the second ion exchanger 18, and the discharged reject flow is passed through the first ion exchanger 17 which is thereby regenerated. The purifying process in the filter unit 10 is not effected by this adjustment and consequently continues without interruption.

The described purifying device operates without addition of salt beyond the amount possibly present in the raw water and consequently does not contribute to increasing the contents of salt in the waste water.

We claim:

1. Device for purifying water by means of reverse osmosis, said device comprising a raw water inlet (20), a filter unit (10) containing an osmotic membrane and having an inlet (11) for water to be filtered, a filtrate outlet (12) for purified water, and a return conduit (14) for unfiltered water and having a reject outlet (22) whereby a relatively large flow is returned to the inlet and a small flow is discharged from said reject outlet, said device further comprising two ion exchange units (17, 18) arranged in parallel and Connected to the filter unit (10) in such a way that said raw water entering the device is first passed through one of said ion exchange units to be softened, and that said flow discharged via the reject outlet (22) is passed in an opposite direction through the other of said ion exchange units to regenerate the same, and valve means (19, 24) for alternately shifting the ion exchange units between functions of softening and regeneration.

2. Device according to claim 1, wherein said return conduit (14) is provided with a filter(16) comprising a porous material having a large filter area.

3. Device according to claim 2, wherein said porous material is active carbon.

4. Device according to claim 2, wherein said porous material is zeolite.

* * * * *